May 20, 1930.  W. L. PAUL  1,759,063
DRAFT ATTACHMENT FOR TRACTORS
Filed Sept. 20, 1926
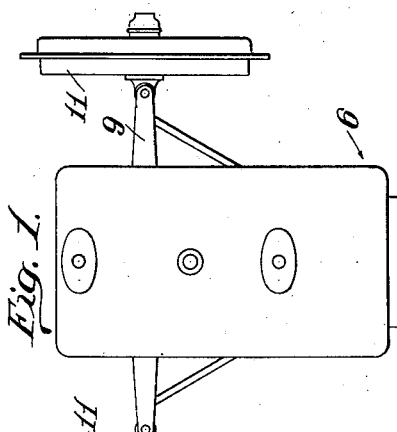
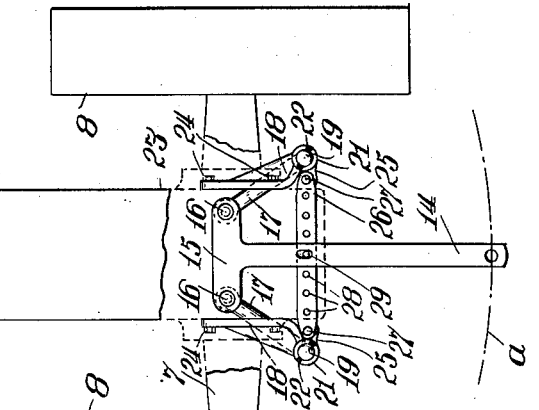
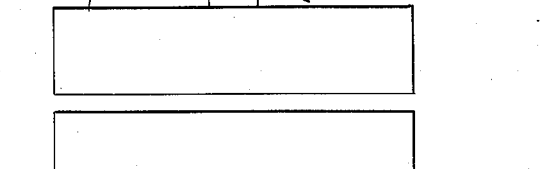
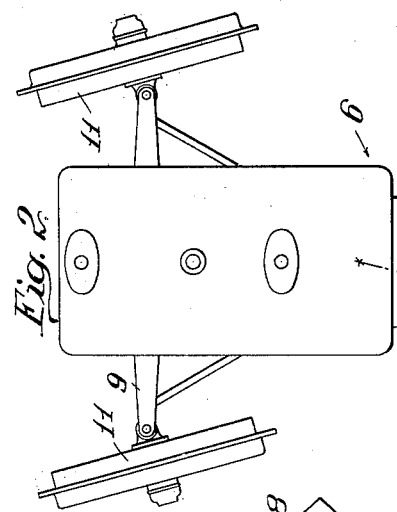
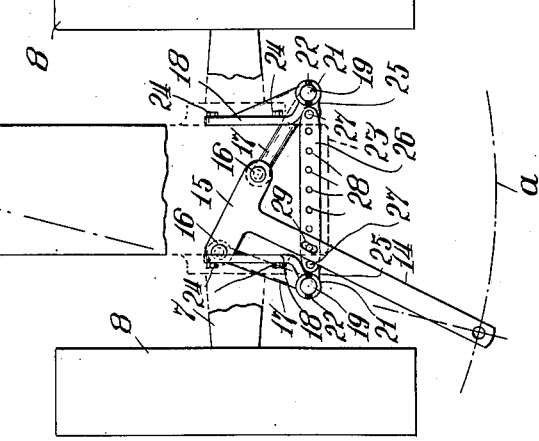
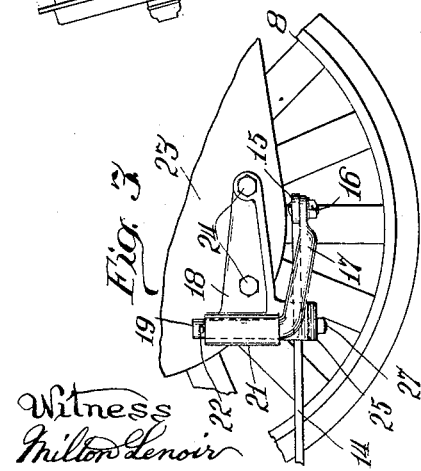
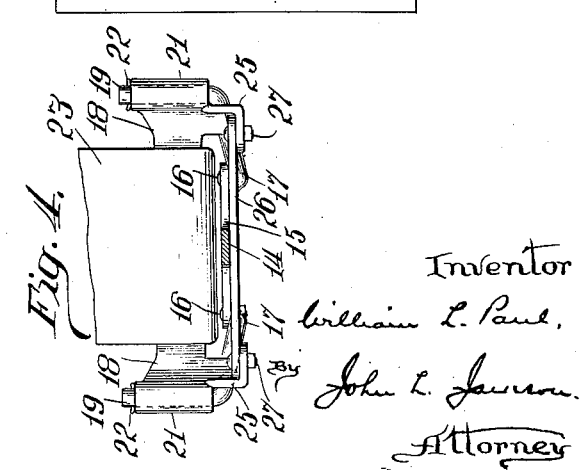
Inventor
William L. Paul,
By John L. Lawson.
Attorney
Witness
Milton Lenoir Patented May 20, 1930

1,759,063

UNITED STATES PATENT OFFICE

WILLIAM L. PAUL, OF BERKELEY, CALIFORNIA, ASSIGNOR TO DEERE & COMPANY, OF MOLINE, ILLINOIS, A CORPORATION OF ILLINOIS

DRAFT ATTACHMENT FOR TRACTORS

Application filed September 20, 1926. Serial No. 136,436.

The present invention relates to draft attachments for tractors. The invention has its principal field of utility in connection with tractors for the pulling of agricultural implements such as drag harrows, disk harrows, cultivators, etc., and in the following description I shall describe the invention in this association with a tractor. It will be understood, however, that in its broader aspects, the invention also has application to other types of vehicles; as, for example, it may be employed for connecting successive trailers, a series of agricultural implements, and other combinations of pulling and pulled vehicles wherein the advantages of the present draft attachment are desired. Furthermore, its use is not restricted to the pulling vehicle, as it may also be employed on the pulled vehicle or other like unit, particularly where the effect of a hitch point intermediate the ends of the vehicle is desired.

The claims hereinafter made are therefore intended to apply to either of such arrangements.

Broadly considered, it is the fundamental aim of the invention to provide a draft attachment which will enable the tractor or other pulling vehicle, together with the implement or other unit being pulled, to be steered and manœuvred under load with maximum ease and certainty, and particularly around short turns. The difficulties ordinarily encountered in steering a tractor exerting a heavy draw bar pull around a short turn arise primarily from the particular location of the point of hitch between the draft attachment and the tractor. With the ordinary draft attachment the hitch point of the load is generally behind the axis of the rear wheels of the tractor, and in such location the line of draft will tend to resist lateral turning of the front end of the tractor when the tractor is being steered through a sharp turn. The result is that the front end of the tractor must "fight" its way around the turn, imposing heavy stresses on the steering wheels and steering linkage, and in many instances causing the front steering wheels to slip laterally over the surface of the ground, even when equipped with the customary guide flanges to prevent this side slipping.

It is the general object of the present invention to provide an improved construction of draft attachment which will avoid these difficulties. An analysis of the forces causing the side slipping of the front end of the tractor around a sharp turn shows that by locating the point of hitch forwardly of the axis of the rear wheels, the resistance offered by the draft load to the steering of the tractor can be overcome to any desired degree. For example, if the point of hitch is disposed in close proximity to the axis of the front wheels, the draft load will actually tend, forcibly, to steer the tractor in any direction in which it may be turned. For most purposes, it is desirable that the point of hitch be located at an intermediate point relative to the axis of the front and rear wheels, where the draft load is approximately balanced in its tendency to steer and to resist the steering of the tractor. It is a further object of the invention to secure the effect of such forward hitch point between the tractor and the draw bar without actually extending the draw bar to this point. In the majority of tractor designs, for practical reasons, it is difficult or objectionable to extend the draw bar to this forward hitch point. Generally, the tractor frame, or corresponding part of the tractor assembly, is not designed to carry the draft load at this point. Furthermore, the considerable length of the draw bar extended to this forward point of hitch may be objectionable because of interference with the rear wheels on a sharp turn, and such length of draw bar may be susceptible to bending. Accordingly, I have designed a unique linkage system which affords a virtual forward hitch point while actually the draw bar and the associated linkage is confined to the rear end of the tractor, and the actual hitch point may be at or near the rear end of the draw bar.

Further objects are to provide a draft attachment of this general type which will be self-centering when the draft load is being pulled straight ahead directly in rear of the tractor; which can be locked with the draw bar at any lateral inclination for holding the implement to one side of the longitudinal axis of the tractor and which will be simple, durable, and inexpensive to manufacture.

In the accompanying drawing illustrating a preferred embodiment of my invention:

Figure 1 is a plan view of a conventional form of tractor represented somewhat diagrammatically, and illustrating the present draft attachment secured thereto.

Fig. 2 is a similar view illustrating the draw bar at a lateral inclination.

Fig. 3 is a fragmentary view taken on a vertical plane to one side of the differential housing for illustrating the mounting of the draft attachment thereon, and Fig. 4 is a rear elevational view illustrating the mounting of this draft attachment on the differential housing.

The tractor, indicated at 6 in its entirety, comprises the usual rear axle 7, rear drive wheels 8—8, the front axle 9 and the steering wheels 11—11. In the typical construction shown, the two steering wheels 11—11 have pivotal support between forked ends of the axle 9, as in standard automobile practice, although, the steering may, of course, be effected through swinging motion of the axle and wheels around a fifth wheel supported by the tractor frame. Where reference is hereinafter made to the "axis" of the front wheels, it will be understood that this has reference to the coincident axes of the two steering wheels when pointed straight ahead, corresponding to the axis of the front axle 9. The front and rear axles are generally connected together through a frame, or through a unit power plant assembly wherein the housing which encloses the clutch, transmission, and differential, serves as the rear part of the frame.

The present draft attachment comprises a draw bar 14 of T-shape having a cross bar 15 at its front end. Pivot bolts 16—16 in the ends of this cross bar, and preferably located equidistantly from the center of the cross bar, connect the bar to the forward or free ends of two links 17—17. These links diverge, or extend outwardly and rearwardly from the pivots 16 and have pivotal attachment at their rear ends to brackets 18 suitably secured to the tractor. As shown in Fig. 3, each link 17 has an upwardly turned pivotal portion 19 which extends through an elongated vertical bearing boss 21 formed as a part of the bracket 18. Thus extended bearings for the links 17 are provided, which minimize friction and serve to strongly support and guide the links in their swinging movement. The arrangement of these bearings also is such that they may be conveniently lubricated. A cotter pin, nut or any other suitable fastening device 22 serves to hold the link in this bearing boss. The brackets 18 may be secured to the tractor at any suitable point at the rear end thereof, but for the standard tractor assembly I prefer to secure these brackets to the sides of the differential housing 23. Fig. 3 illustrates these brackets so attached to the lower part of a differential housing by bolts 24. As shown in this figure, the brackets are mounted adjacent the bottom of the differential housing so as to dispose the draw bar 14 below the housing and still retain a relatively straight line end thrust on the links 17.

Depending from the brackets adjacent the inner sides of the bearing bosses 21 are two steps or bracket extensions 25, as best shown in Fig. 4. A cross bar 26 extends between these angle brackets 25, having its ends secured thereto by bolts 27. The draw bar 14 rests on the upper surface of this cross bar 26, the latter serving as a guide for supporting and guiding the draw bar in its lateral movement. The cross bar 26 also serves as a coupling member for rigidly securing the draw bar in any angular position when desired, and to this end it is provided with a plurality of vertical holes 28 therein adapted to receive a bolt or other coupling pin dropped down through an opening 29 in the draw bar.

Since the forward ends of the links 17 are free to swing laterally, inasmuch as they are not connected with the tractor, they provide a floating support for the draw bar, so that in the normal operation of the device, the draw bar will swing laterally with the varying angle of the line of draft as the tractor turns, as is true of any pivoted draw bar, but it will also move bodily laterally coincidently with the swinging of the links 17 in response to variation of the line of travel of the vehicle. By virtue of the swinging movement of the links 17, this lateral swinging and movement bodily of the draw bar will carry the actual hitch point of the load about a virtual pivot located considerably forward of the front end of the bar. This follows from the fact that the two pivot points 16 on the draw bar are compelled to swing on separate arcs defined by the pivotal motion of the links 17, whereby one of the pivot points 16 moves forwardly while the other moves rearwardly in the transverse swing of the draw bar. The net result of this action is that the actual hitch point, which is usually at or near the rear end of the bar, is compelled to swing in a comparatively flat arc $a$ (or circular path corresponding substantially identically with a true arc) having an apparent center at a point considerably forward along the longitudinal central axis of the tractor. By virtue of this action, the line of draft will extend at an angle to the length of the draw bar in the angular positions of the latter, giving the same effect as though the draw bar were pivoted to the tractor at this forward point. As before described, by applying the draft load along a line extending to this forward point, the resistance offered to turning of the tractor can be reduced to a minimum, and, in fact, if this virtual hitch point is disposed sufficiently close to the axle 9, the draft load will actually tend forcibly to steer the tractor when this draft load is swung to either side of the longitudinal central axis of the tractor. For most purposes I find it preferable to locate this virtual pivot at a point where the tendency of the draft load to resist steering will approximately balance the tendency of the draft load to compel steering. With this location of the virtual pivot, the tractor can be steered with complete independence of any influences from the draft load. While this is the preferred arrangement, it will, of course, be understood that the links 17 and the location of the pivotal centers 16 and 19 can be proportioned so as to dispose this virtual pivot at any intermediate point between the front and rear axles. For example, by shortening the transverse dimension between the pivots 16 the radius of swing of the draw bar can be shortened.

In addition to facilitating the manœuvreing of the tractor, the present draft attachment has the further advantage of avoiding the loss of power incident to the tractor fighting its way around a short turn, thus enabling the turn to be taken more rapidly. Another advantage is that the objectionable tendency of the implement to swing wide or outwardly, particularly on a short turn, is avoided because this point of pivotal attachment has no lever action relative to the center of the turning movement of the tractor. It will also be observed that the draw bar can swing laterally to a relatively sharp angle without striking or interfering with the tractor wheels 8. Also, the action of the links 17 is such that the draw bar is self-centering when the line of draft of the implement is directly in rear of the tractor. The present construction permits the draw bar to be disposed comparatively high, in close proximity to the bottom of the differential housing, so that the clearance of the tractor is not appreciably reduced. It is almost invariably the practice to locate the hitch point below the axis of the rear wheels, so as to minimize the likelihood of the tractor "rearing" under a stalling load, but if a high hitch point should be desired for any reason, the present attachment is also admirably suited to this as it may be arranged so as not to interfere with the axle housing, driver's seat, controls, etc., something not possible if the draw bar had to extend forwardly to an actual pivot point.

If it should be desired to provide a side point of hitch for pulling an implement in rear and to one side of the tractor, the draw bar 14 can be swung to the desired angle and locked in such position by dropping a coupling pin through the opening 29 in the draw bar and through one of the adjacent holes 28 in the cross bar 26. This locking relation between the draw bar and cross bar enables the draw bar to be locked in fixed position for backing, if such rigid holding of the draw bar is necessary. As before remarked, this cross bar also serves as an effective support and guide for the draw bar.

The foregoing arrangement and proportion of parts represents what I consider a preferred embodiment of my invention, but, of course, such may be changed widely without departing from the essence of the invention.

What I claim as my invention and desire to secure by Letters Patent, is—

1. The combination with a pulling vehicle comprising front and rear axles, of a draft attachment therefor comprising a draw bar, and floating supporting means disposed adjacent the rear end of said vehicle and connected therewith and with the draw bar, for supporting said draw bar for movement transversely of the vehicle and normally free swinging movement about a virtual axis disposed between said front and rear axles and forwardly of said supporting means.

2. In combination, a tractor, bracket means secured to said tractor, a pair of links pivoted to said bracket means on transversely spaced centers, and having forwardly converging ends normally free to swing laterally, a draw bar pivotally connected to the free ends of said links, and a cross bar carried by said bracket means and on which said draw bar is adapted to slide in its pivotal movement, said cross bar having openings therein for receiving a coupling pin or the like for locking said draw bar in a selected angular position.

3. In combination, a vehicle, a draw bar associated therewith, and means floatingly supporting said draw bar for automatic simultaneous bodily and swinging movement in response to variation of the line of travel of the vehicle, to carry the actual hitch point of the load about a pivotal center lying beyond the end of said draw bar and beyond said supporting means.

4. In combination, a vehicle, a draw bar associated therewith, means floatingly supporting said draw bar for automatic simultaneous bodily and swinging movement in response to variation of the line of travel of the vehicle, to carry the actual hitch point of the load about a pivotal center lying beyond the end of said draw bar and beyond said supporting means, and means carried by the vehicle for supporting the weight of the draw bar during its movement.

5. In combination, a vehicle, a draw bar associated therewith, means floatingly supporting said draw bar for automatic simultaneous bodily and swinging movement in response to variation of the line of travel of the vehicle, to carry the actual hitch point of the load about a pivotal center lying beyond the end of said draw bar and beyond said supporting means, and means operable to hold the draw bar in different angular positions.

6. In combination, a vehicle, a draw bar associated therewith, and normally free cooperating swinging links connected at one end with the vehicle and having their opposite ends free to float with respect to the vehicle, and connected with opposite sides of the draw bar, and operating upon variation of the line of travel of the vehicle to move the draw bar bodily laterally and also to swing it laterally.

7. In combination, a vehicle, a draw bar associated therewith, normally free cooperating swinging links connected at one end with the vehicle and having their opposite ends free to float with respect to the vehicle, and connected with opposite sides of the draw bar, and operating upon variation of the line of travel of the vehicle to move the draw bar bodily laterally and also to swing it laterally to carry the actual hitch point of the load about a pivotal center lying beyond the points of connection of the links with the draw bar, and means carried by the vehicle for supporting the weight of the draw bar during its movement.

8. In combination, a vehicle, a draw bar associated therewith, and oppositely inclined swinging links having floating ends connected with opposite sides of the draw bar and having vertically extended pivots at their opposite ends journaled in bearings carried by the vehicle, said links operating to swing the draw bar transversely to carry the actual hitch point of the load about a pivotal center lying beyond the end thereof.

9. In combination, a vehicle, a draw bar associated therewith, oppositely inclined swinging links having floating ends connected with opposite sides of the draw bar and having vertically extended pivots at their opposite ends journaled in bearings carried by the vehicle, a member extending transversely of the vehicle for supporting the draw bar during its movement, said links operating to swing the draw bar transversely to carry the actual hitch point of the load about a pivotal center lying beyond the end thereof, and means carried by said member for holding the draw bar in different angular positions.

10. The combination with a vehicle, of a draft attachment therefor comprising a draw bar, and floating supporting means carried by the vehicle adjacent to one end thereof, for supporting said draw bar for bodily and swinging movement relatively to the vehicle in response to lateral deflections of the line of draft.

11. The combination with a vehicle, of a draft attachment therefor comprising a draw bar, floating supporting means carried by the vehicle adjacent to one end thereof, for supporting said draw bar for bodily and swinging movement transversely of the vehicle to carry the hitch point of the load about an axis disposed outside of the structure of the draw bar, and means for supporting the weight of the draw bar during its transverse movement.

12. The combination with a pulling vehicle, of a draft attachment comprising a draw bar, and floating supporting means carried by the vehicle adjacent the rear end thereof, for supporting said draw bar for movement transversely of the vehicle about an axis disposed outside of the draft attachment, and forwardly of the forward end of said draw bar.

13. The combination with a pulling vehicle, of a draft attachment comprising laterally swinging forwardly converging links pivotally supported at their rear ends on the vehicle, and having their forward ends free to move laterally, and a draw bar pivotally connected with the forward end portions of said links to move bodily and to swing laterally therewith, to swing the actual hitch point of said draw bar in an arc about a pivotal center lying beyond the forward end of the draft attachment.

14. The combination with a pulling vehicle, of a draft attachment comprising laterally swinging forwardly converging links pivotally supported at their rear ends on the vehicle, and having their forward ends free to move laterally, a draw bar pivotally connected with the forward end portions of said links to move bodily and to swing laterally therewith, to swing the actual hitch point of said draw bar in an arc about a pivotal center lying beyond the forward end of the draft attachment, the rear end portions of said links being upturned to provide extended pivots for said links, and bearings for said pivots at opposite sides of the vehicle.

15. The combination with a tractor, of a draft connection comprising a draft member, and floating means carried by the tractor and connecting said draft member therewith to move bodily relatively thereto and to swing about a point remote from the point of physical connection of said draft member with the tractor.

16. The combination with a tractor, of a draft connection comprising a draft member, and supporting links mounted on the tractor at separated points and having free floating end portions pivotally connected with said draft member whereby said draft member may move bodily relatively to the tractor and swing about a point remote from the points of its physical connection therewith.

WILLIAM L. PAUL.

CERTIFICATE OF CORRECTION.

Patent No. 1,759,063.                                                               Granted May 20, 1930, to

WILLIAM L. PAUL.

It is hereby certified that error appears in the printed specification of the above numbered patent requiring correction as follows: Page 3, line 87, claim 1, before the word "movement" insert the word "bodily"; and that the said Letters Patent should be read with this correction therein that the same may conform to the record of the case in the Patent Office.

Signed and sealed this 24th day of June, A. D. 1930.

M. J. Moore, (Seal)                                                          Acting Commissioner of Patents.